June 28, 1966 D. I. PROMISH 3,258,602
PHOTODETECTING APPARATUS HAVING CRYOGENIC COOLING AND FLUSHING MEANS
Filed Aug. 23, 1963
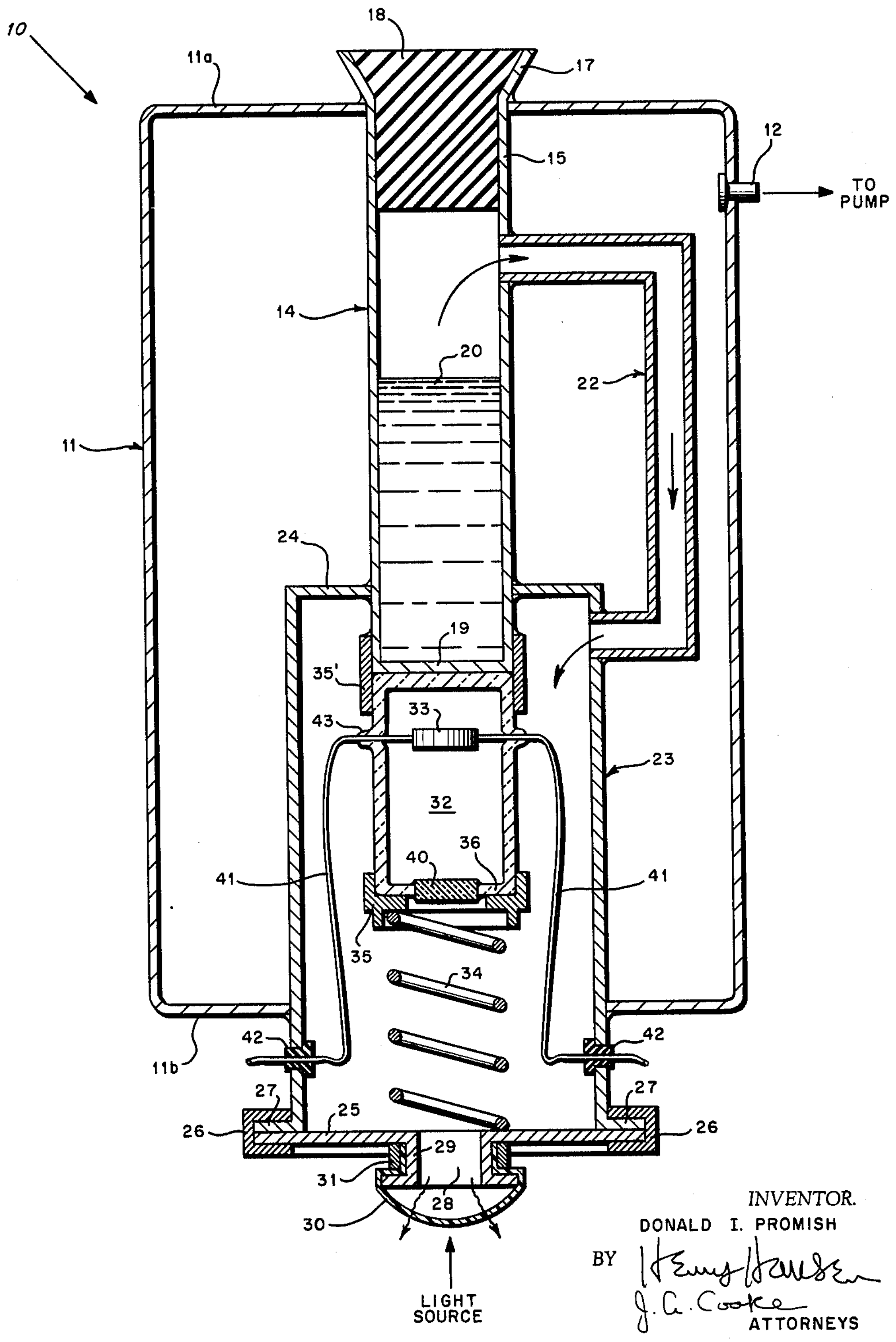
INVENTOR.
DONALD I. PROMISH
BY Henry Hansen
J. C. Cooke
ATTORNEYS United States Patent Office 3,258,602
Patented June 28, 1966

3,258,602
PHOTODETECTING APPARATUS HAVING CRYOGENIC COOLING AND FLUSHING MEANS

Donald I. Promish, Philadelphia, Pa., assignor to the United States of America as represented by the Secretary of the Navy Filed Aug. 23, 1963, Ser. No. 304,286
11 Claims. (Cl. 250—238)

The invention described herein may be manufactured and used by or for the Government of the United States of America for governmental purposes without the payment of any royalties thereon or therefor.

This invention relates to photodetecting apparatus and more particularly to a system for maintaining sensitive surfaces of a photodetecting element free from gaseous contamination and at low temperatures.

Photoconductive cells are devices used for detecting or measuring electromagnetic radiation by the variation in conductivity of a substance, called a photoconductor, upon absorption of radiation by the substance. To detect or measure the radiation, the cell is connected in series with an electrical source and a galvanometer. The current through the cell is measured by the galvanometer and is a function of the intensity of the radiation falling on the cell. In detecting electromagnetic radiation having a wavelength greater than that detectable by the human eye, that is, in the infrared, the photoconductors are cooled with liquid nitrogen (—196 deg. C.), liquid hydrogen (—250° C.) or liquid helium (—269° C.) to increase the sensitivity thereof.

These photoconductive devices or cells are used in electronic equipment for many purposes, such as detecting fires, detecting overheating in machinery, detecting planes, vehicles and even people, and controlling temperature-sensitive industrial processes.

In the photoconductive cells of the prior art, the rate of infusion of atmospheric gases, particularly helium, into the ultra high vacuum cells has caused the deleterious loss of sensitivity due to the gas coating the surface of the surrounding chamber and the photosensitive element. In addition, during cooling of the photoconductive cells to liquid nitrogen temperatures or to liquid helium temperatures, the light transmitting window of the cell incurred a fogging condition, also reducing the sensitivity of the photodetecting device. When liquid helium was used as the cooling i.e., cryogenic liquid for the cells, the problem of atmospheric helium infusion into the ultra high vacuum cells became extremely critical.

In order to avoid these above noted conditions, an additional chamber was formed surrounding the photodetecting cell and the space between the cell and additional chamber was evacuated of all gases and a vacuum formed therebetween. The additional chambers or envelopes required germanium or silicon windows similar to those formed in the photodetecting cell for allowing radiation to pass into the enclosure. The use of these windows or filters required special pressure seals between the windows and the surrounding chamber or envelope. Additionally, the pressure differential between the vacuum and the surrounding external atmospheric pressure resulted in the cracking of the extremely expensive windows or filters. Also, if the cell in the vacuum area of the cooling system were nevertheless to become ineffective and insensitive due to condensation or structural failure thereof, the cell was not easily removed since its removal would necessitate the breaking of the seals or the breaking of the outer chamber.

In order to maintain the vacuum between the cell and the outer chamber or envelope, continual and prolonged baking and pumping was required in addition to the formation of special vacuum seals at the location where the electrical leads entered the outer envelope for connection with the electrical connections provided on the photodetecting cell structure.

The above noted deleterious conditions are obviated by the present invention in which a light sensitive element is maintained at extremely low temperatures and free from gaseous contamination by enclosing the light sensitive element within a glass ultra high vacuum cell and by having a heat sink filled with a cryogenic liquid adjacent the cell for cooling the same. An open-end, double-wall vacuum enclosure surrounds both the cell and the heat sink and in turn includes a window of porous, transparent, plastic material closing said open end. Gas from the cryogenic liquid passes the cell flushing the area adjacent thereto and passes through the porous window.

An object of the present invention is to reduce the rate of infusion of atmospheric gases, particularly helium, into highly evacuated photosensitive cells and to prevent the fogging of the light transmitting windows during the performance of cooling of such cells to liquid nitrogen temperatures or liquid helium temperatures.

A further object of the present invention is to provide a photodetecting apparatus wherein the photodetecting cell is easily removable for purposes of repair or replacement.

A still further object of the present invention is to eliminate the requirement of special seals in the outer protective envelope between the light transmitting window and the envelope structure.

Still a further object of the present invention is to provide an efficient, inexpensive and reliable photodetecting apparatus which will operate in the infrared range.

Other objects and many of the attendant advantages of this invention will be readily appreciated as the same becomes better understood by reference to the following detailed description when considered in connection with the accompanying drawing in which like reference numerals designate like parts throughout the figures thereof and wherein the figure shows an elevation view in section of an embodiment of the photodetecting apparatus of the present invention.

Referring now to the drawing, there is shown in the figure a photodetecting apparatus generally noted at 10 including an outer protective enclosure or envelope 11 having an upper end wall 11*a* and lower end wall 11*b* and further including a valve 12 communicating with the interior of the enclosure 11 for connection with a pump, not shown, for providing a vacuum within the enclosure 11. The protective enclosure 11 is formed of metal or other appropriate material of sufficient strength to withstand the vacuum formed therein. A tubular member or vessel generally noted at 14 is housed within the confines of the enclosure 11 and includes a neck portion 15 rigidly fixed to the enclosure 11 by weld or other appropriate means. The neck portion 15 extends beyond the confines of the outer enclosure 11 and is flared at 17 for receiving a removable vacuum seal or cap 18. The vessel 14 is closed at the end opposite the neck portion 15 by a bottom wall 19. The tubular vessel 14 is partially filled with a cryogenic liquid indicated at 20 such as liquid nitrogen which is permitted to boil off in the form of liquid nitrogen gas through said arm 22 interconnecting the vessel 14 with the upper portion of a lower chamber noted at 23 which is also constructed of metal or other appropriate material. Chamber 23 is secured at its upper end wall 24 to vessel 14 by welds or the like and is additionally appropriately secured intermediate its ends to the lower end wall 11*b* of enclosure 11.

Removable end wall 25 is secured by clamps 26 to flanges 27 which is formed on the lower chamber 23. An aperture 28 is centrally fashioned in the end wall 25 and a circular flange 29 is constructed about the periphery thereof. A window 30 of strong, thin plastic, porous and transparent material with a useful transmission spectrum from 2250 Angstroms in the ultraviolet to 15,000 Angstroms in the infrared, such as that marketed under the trade mark of Saran Wrap is clamped to flange 29 by clamping ring 31.

A highly-evacuated photoconductive vacuum cell 32 having a photosensitive element 33 contained therein of germanium or the like, is supported and held in abutting relation to the bottom wall 19 of the vessel 14 for purposes of cooling the cell 32. This arrangement is obtained by the mutual cooperation of a compression spring 34 interposed between the removable end wall 25 and a retaining ring 35 connected to the cell 32. An alignment ring 35' serves to accurately position the cell 32 relative to vessel 14. The lower end wall 36 of the cell 32 houses an optical window or filter 40 of sapphire, germanium or the like for allowing the radiation to pass therethrough to be subsequently absorbed by the photosensitive element 33.

In order to measure the above absorbed radiation, electrical leads 41 from an electrical source and measuring device, not shown, enter the lower chamber 23 through grommets 42 and interconnect with element 33 after passing through vacuum seals 43 provided in the walls of cell 32.

As shown in the drawing, the vessel 14 containing liquid nitrogen with a temperature at normal atmospheric pressure of −196° C. acts as a heat sink by abutting the photoconductive cell 32 and cooling the same. The boil-off from the liquid nitrogen 20 passes through side arm 22 and then into the chamber 23 for flushing out the gases contained therein. This is accomplished by reason of the porous window 30 which permits the nitrogen gas to pass slowly out of the lower chamber 23.

The liquid nitrogen is practically free of helium which liquifies at −269° C. and does not dissolve in liquid nitrogen. The boil-off thereby provides an ideal atmosphere for the prevention of helium infusion into the cell 32. Additionally, since moisture is removed by the constant flushing effect of the liquid nitrogen boil-off, no condensation occurs in the chamber 23 or on the cell 32. As the nitrogen diffuses through the porous window 30 it provides a dry active barrier against moisture, preventing condensation on the outside of the window. Diffusion is slow enough so that condensation does not form in the air near the window.

It is realized that while the cooling and flushing operations are occurring radiation is permitted to pass through the transparent window 30, the optical window or filter 40, and is sensed by the photosensitive element 33.

It will be understood that various changes in the details, materials, steps and arrangements of parts which have been herein described and illustrated in order to explain the nature of the invention, may be made by those skilled in the art within the principle and scope of the invention as expressed in the appended claims.

What is claimed is:

1. Apparatus for maintaining a light sensitive element at extremely low temperatures and free from gaseous contamination, comprising:

sensing means for absorbing electromagnetic radiation, said sensing means enclosed within an ultra high vacuum cell having a first window therein for allowing electromagnetic radiation to pass therethrough to said sensing means, heat sink means including liquid nitrogen associated with said vacuum cell for cooling said cell and said enclosed sensing means, a chamber surrounding said ultra high vacuum cell and having a second transparent window therein for allowing electromagnetic radiation to pass therethrough to said first window, said second window being of thin, porous and plastic material having a light transmission spectrum from 2250 Angstroms in the ultraviolet to 15,000 Angstroms in the infrared, means interconnecting said heat sink means and said chamber, nitrogen gas passing from said heat sink means to said chamber through said interconnecting means and passing outwardly through said porous window for continuously flushing the area surrounding said ultra high vacuum cell, a vacuum enclosure means enveloping said cell and a portion of said chamber for preventing conduction of heat, and electrical circuit means connected to said sensing means measuring the variation of the conductivity of the same.

2. The apparatus of claim 1 wherein the sensing means is formed of germanium.

3. The apparatus of claim 1 wherein said chamber includes a removable end wall, and said second window being secured to said end wall, whereby said cell is easily removable for replacement or repair.

4. The apparatus of claim 3 wherein said first window is formed of sapphire.

5. The apparatus of claim 3 wherein said cryogenic liquid is nitrogen.

6. The apparatus of claim 3 wherein said cryogenic liquid is helium.

7. Apparatus for maintaining a light sensitive element at extremely low temperatures and free from gaseous contamination, comprising:

sensor means for absorbing electromagnetic radiation, said sensor means enclosed within an ultra high vacuum cell having a first window therein for allowing electromagnetic radiation to pass therethrough to said sensor means, heat sink means including a cryogenic liquid associated with said vacuum cell for cooling said cell and said enclosed sensor means, a chamber surrounding said ultra high vacuum cell and having a second window therein for allowing electromagnetic radiation to pass therethrough to said first window, said second window being of thin, porous and plastic material having a broad light transmission spectrum, means interconnecting said heat sink means and said chamber, gas from said cryogenic liquid passing from said heat sink means to said chamber through said interconnecting means and passing outwardly through said porous window for continuously flushing the area surrounding said ultra high vacuum cell, and electrical circuit means connected to said sensor for measuring the variation of the conductivity of the same.

8. Apparatus for maintaing a light sensitive element at extremely low temperatures and free from gaseous contamination, comprising:

a sensing means for absorbing electromagnetic radiation, said sensing means enclosed within an ultra high vacuum cell having a first window therein for allowing electromagnetic radiation to pass therethrough to said sensing means, heat sink means including a cryogenic liquid association with said vacuum cell for cooling said cell and said enclosed sensing means, an open-end, double wall vacuum enclosure means surrounding said cell and said heat sink means for preventing heat conduction thereto, a second window of porous, transparent, plastic material closing said open end, and means interconnecting said heat sink means and said enclosure means, gas from said cryogenic liquid passing from said heat sink means to said enclosure means through said interconnecting means and passing through said porous window and flushing the area adjacent the cell.

9. The apparatus of claim 8 wherein said cryogenic liquid is nitrogen.

10. The apparatus of claim 8 wherein said cryogenic liquid is helium.

11. Apparatus for maintaing a light sensitive element at extremely low temperatures and free from gaseous contamination wherein the light sensitive element is enclosed within a glass ultra high vacuum cell, comprising:

heat sink means including a cryogenic liquid associated with the cell for cooling the same, an open-end, double-wall vacuum enclosure means surrounding the cell and said heat sink means for preventing heat conduction thereto, a window of porous, transparent, plastic material closing said open end, and gas from said cryogenic liquid passing through said porous window and flushing the area adjacent the cell.

References Cited by the Examiner

UNITED STATES PATENTS

| | | | |
|---|---|---|---|
| 3,006,157 | 10/1961 | Haettinge et al. | 250—83.3 |
| 3,018,643 | 1/1962 | Evers | 250—83.3 |

RALPH G. NILSON, *Primary Examiner.*

J. D. WALL, *Assistant Examiner.*